May 20, 1969 D. M. GLUNTZ 3,445,335
NUCLEAR REACTOR SYSTEM WITH JET PUMP FLOW MEANS
Original Filed May 28, 1965 Sheet 1 of 3

INVENTOR.
DOUGLAS M. GLUNTZ

# United States Patent Office 3,445,335
Patented May 20, 1969

3,445,335
NUCLEAR REACTOR SYSTEM WITH JET PUMP FLOW MEANS
Douglas M. Gluntz, San Jose, Calif., assignor to General Electric Company, New York, N.Y., a corporation of New York
Continuation of application Ser. No. 459,836, May 28, 1965. This application Aug. 9, 1967, Ser. No. 659,536
Int. Cl. G21c 15/24, 19/28
U.S. Cl. 176—61              3 Claims

ABSTRACT OF THE DISCLOSURE

A nuclear reactor system including at least one jet pump having means for measuring flow therethrough is disclosed. Flow is measured by a pair of pressure taps, both of which are located downstream of the jet pump inlet opening. In a preferred embodiment, the two pressure taps are located in spaced series along the jet pump diffuser.

Background of the invention

This application is a continuation of my copending application Ser. No. 459,836, filed May 28, 1965, now abandoned.

This invention relates to jet pumps and means for measuring the rate of fluid-flow through such pumps.

A conventional jet pump includes a body with three distinct regions, namely, an inlet or suction section, a throat or a mixing chamber of substantially uniform cross-sectional area throughout its length, and a diffuser which increases in cross-sectional area in the direction of flow. A nozzle is positioned in the inlet section to convert a high-pressure stream of driving fluid into a high-velocity, low-pressure jet of driving fluid which flows coaxially through the inlet section and into the mixing chamber. Upon pump start-up, a combination of ram action and entrainment action by the high-velocity jet tends to displace fluid from the mixing chamber. As the fluid in the mixing chamber becomes displaced, pressure tends to fall at the mixing chamber entrance. Higher pressure fluid from the surroundings begins to flow toward this lower pressure region, being guided efficiently alongside the nozzle and into the mixing chamber via a converging inlet preceding the mixing chamber entrance. This secondary flow is termed suction flow. An equilibrium flow balance between the driving stream and suction stream ultimately results, and the flow proportions are dependent upon the capability of the drive stream in exhausting or ramming merged fluid from the downstream portions of the jet pump body against the back-pressure created at the pump exit by downstream flow resistances.

Within the mixing chamber, the details of the flow process consist of turbulent mixing occurring between the two streams of differing velocities. The high-velocity jet of driving fluid gradually widens as an entrainment-mixing process takes place with the driven fluid or suction stream. The mixing transfers momentum from the jet driving stream to the driven suction stream, so pressure in the combined stream rises. In theory, the mixing chamber ends after a near-uniform velocity profile is achieved, and this usually occurs shortly after the widening driving jet stream touches the mixing chamber walls. From the relatively small cross-sectional area mixing chamber, the merged driving and driven fluids flow into the diffuser of increasing cross section in the direction of flow, further increasing pump discharge pressure as the velocity of the merged fluids is reduced to extract the optimum amount of energy from the stream.

As can be seen from the foregoing description, the principle of operation of a jet pump is the efficient investment of momentum into the suction stream and the subsequent recovery of the momentum of the merged streams via conversion of momentum into pressure. The driving fluid from the nozzle has high velocity and momentum. By a process of momentum exchange, driven fluid from the suction section is entrained and the combined flow enters the mixing section where the velocity profile, i.e., a curve showing the fluid velocity as a function of distance from the longitudinal axis of the mixing section, is converted by mixing in such a manner that momentum decreases and the velocity profile becomes flat, i.e., perpendicular to the longitudinal axis of the mixing chamber. The decrease in momentum results in an increase in fluid pressure. For optimum operation, the velocity profile at the exit of the mixing chamber should be as flat as possible. In other words, velocity of the fluid should be the same throughout the cross-sectional area of the mixing chamber outlet, and the boundary layer (the relatively thin layer of fluid near the boundary of fluid-flow against the interior surface of the mixing chamber where fluid velocity decreases very rapidly with reduced distance from the wall of the mixing chamber) as thin as possible. The flat velocity profile gives minimum momentum with the highest resultant pressure increase in the mixing chamber. A thin boundary layer (rather than a relatively thick layer) is necessary for optimum performance of the diffuser which follows the mixing chamber. In the outwardly diverging diffuser, the relatively high velocity of the combined streams is smoothly reduced and converted to a still higher pressure so the combined driven and driving streams flow out the diffuser at the desired pressure.

In a nuclear reactor, safety precautions require means for measuring the total fluid-flow rate through one or more selected jet pumps. This invention provides such means which are economical, and do not interefere with the efficiency or operation of the pump.

Summary of the invention

Briefly, the invention measures rate of fluid-flow by sensing the pressure of fluid within the pump body. I have found that the measured pressure recovery in the diffuser section of a typical jet pump corresponds at a reliable relation to the ideal (calculated) pressure recovery. In fact, actual measurements of pressure recovery in a jet pump diffuser have shown a linear relationship to ideal (calculated) pressure recovery. This relationship makes it possible to determine flow rate through a jet pump by the simple and inexpensive technique of measuring fluid pressure at two or more axial positions within the pump body.

Flow rate determined in accordance with this invention has been found accurate within one percent at the ninety-five percent confidence level under test conditions wherein the diffuser flow regime remains constant, i.e., under conditions wherein the pattern of fluid-flow streamlines has not markedly changed over the range of measurement interest as a result of the development (or elimination) of flow separation from the walls of the diffuser, or from a change in basic fluid properties, or by other processes known to those familiar in the art which can affect flow regime changes.

In the preferred form of this invention, two longitudinally-spaced pressure taps on the diffuser are connected to a differential pressure gauge to sense change in pressure along the length of the diffuser. The pressure difference is an accurate measure of fluid-flow rate through the pump.

In another form of the invention, one pressure tap is located in the throat or mixing section, and another in the diffuser. These two taps are connected to a differential pressure gauge to measure fluid-flow rate through the pump.

In another form, a pressure tap in the diffuser and one in the tail pipe are connected to a differential pressure gauge. In yet another form of the invention, a pressure tap in the tail pipe and one in the mixing chamber are connected to a differential pressure gauge.

Brief description of the drawings

These and other aspects of the invention will be more fully understood from the following detailed description and the accompanying drawings, in which.

Detailed description of the invention

Figure 1:
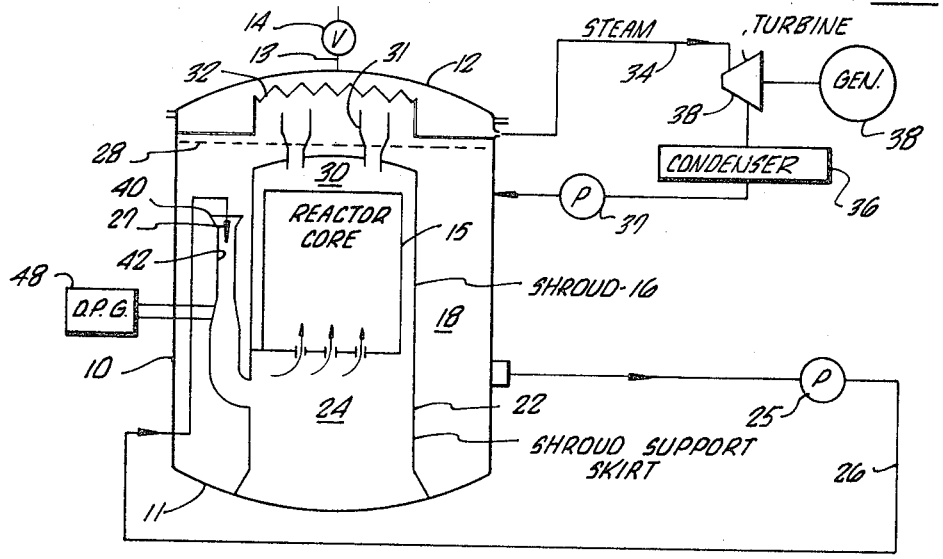
FIG. 1 is a schematic elevation of a jet pump of this invention mounted in a boiling-water nuclear reactor.

Referring to FIG. 1, an upright, cylindrical pressure vessel 10 is closed at its lower end by a dish-shaped bottom head 11. The upper end of the pressure vessel is closed by a removable dome-shaped top head 12. A vent pipe 13 in the top head is normally closed by a valve 14. A conventional reactor core 15 is disposed within a core shroud 16 mounted coaxially within a pressure vessel so that an annular downcomer space 18 is formed between the shroud and the pressure vessel. An upright jet pump 20 (more than one jet pump is normally used, but for brevity only one pump is described) is mounted in the downcomer space with the discharge end of the pump connected to a cylindrical shroud support skirt 22 secured to the bottom of the shroud core to form a core flow-entrance (or lower core) plenum 24. Driving fluid is supplied by a recirculation pump 25 through a line 26 connected to a nozzle 27 at the upper or inlet end of the pump. A high-velocity stream of water is directed by the nozzle into the pump inlet to suck driven fluid from a pool of water in the downcomer space and drive it into the lower-core plenum 24. Water is maintained in the pressure vessel at a level 28 (as indicated by the dotted line) above the inlet end of the jet pump.

Water is forced through the reactor core where it extracts heat and is flashed into steam up into a steam plenum 30 overlying the reactor core. A mixture of steam and water droplets pass through steam separators 31 and steam dryer panels 32, both of which may be conventional. Water separated from the mixture is returned to the downcomer 18, while steam leaves the pressure vessel through streamline 34 to drive a turbine 35. A condenser 36 condenses steam leaving the turbine and the condensed steam is returned by pump 37 to the pool of water in the pressure vessel. The turbine can be used to drive a generator 38, or for any other required purpose.

Figure 2:
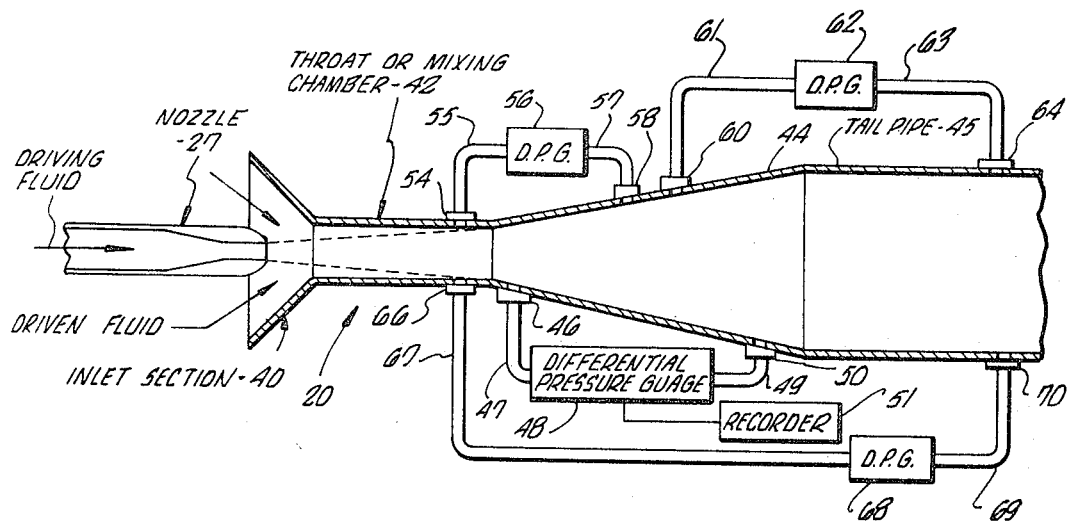
FIG. 2 is an enlarged schematic drawing of the jet pump shown in FIG. 1.

Referring to FIG. 2, the pump body 20 includes a converging inlet suction section 40 connected at its smaller end to the upstream end of an elongatetd, cylindrical throat or mixing chamber 42. The wider end of the inlet suction opens toward the nozzle 27, which is colinear with the longitudinal axis of the mixing chamber.

The opposite or downstream end of the mixing chamber is connected to the smaller end of a frusto-conical diffuser 44 which discharges at its larger end into a cylindrical tail pipe section 45 connected to the lower-core plenum 24 shown in FIG. 1.

A first pressure tap 46 mounted in the wall of the diffuser adjacent the diffuser inlet is connected by a tube 47 to one side of a first differential pressure gauge 48. The other side of the gauge is connected by a tube 49 to a second pressure tap 50 connected into the diffuser adjacent its outlet end. The pressure taps may be of any conventional type, but preferably they are mounted to be flush with the interior of the pump body wall, or otherwise constructed not to induce any interference with fluid-flow or pressure distribution within the pump. A recorder 51 is connected to the differential pressure gauge to provide a permanent record.

Figure 3:
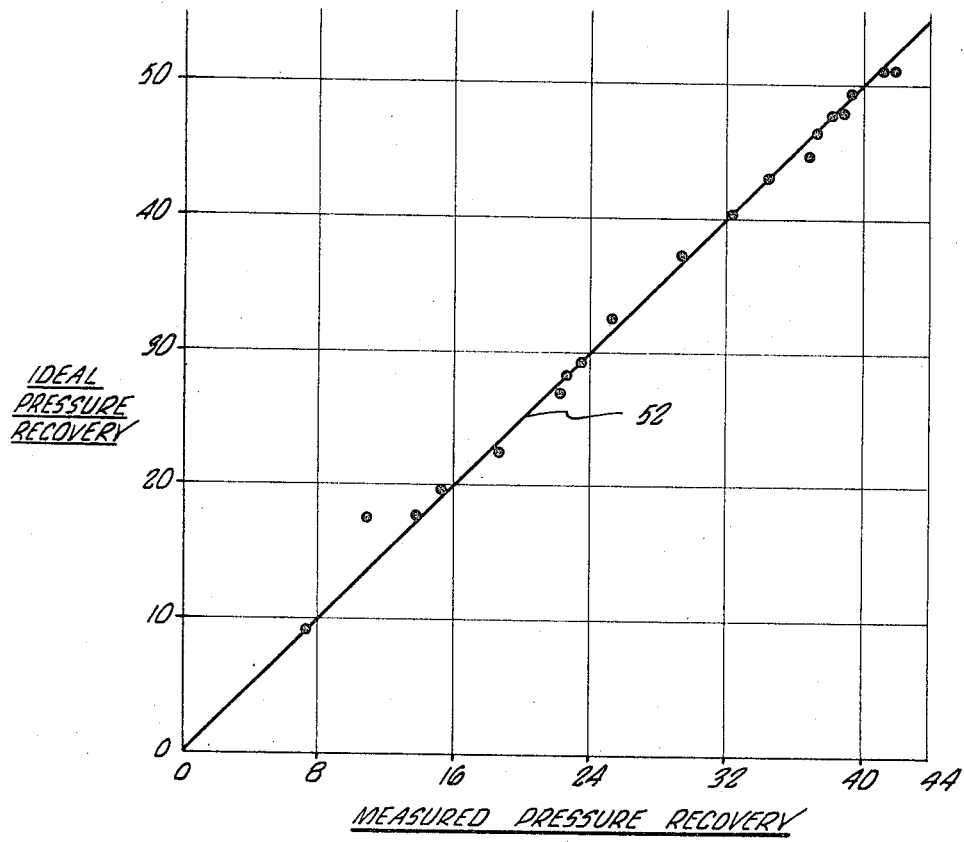
FIG. 3 is a plot of ideal pressure recovery versus measured pressure recovery showing the reliability of this invention for measuring fluid-flow rate through a jet pump.

FIG. 3 is a plot of data obtained from a typical jet pump with pressure taps mounted in the diffuser and connected to a differential pressure gauge as shown in FIG. 1. The pump was operated at various flow rates and ideal pressure recovery was calculated in accordance with well-known equations. The actual or measured pressure recovery was sensed with the differential pressure gauge 48 shown in FIG. 2.

The straight-line relationship between the ideal (calculated) pressure recovery and the measured (actual) pressure recovery shown by line 52 on the plot of FIG. 3 demonstrates that measured pressure recovery can be used to indicate fluid-flow rate through the pump. The relatively insignificant scattering of the data points shows that the measurement is reliable within a nominal one percent value at a ninety-five percent confidence level.

Figure 4:
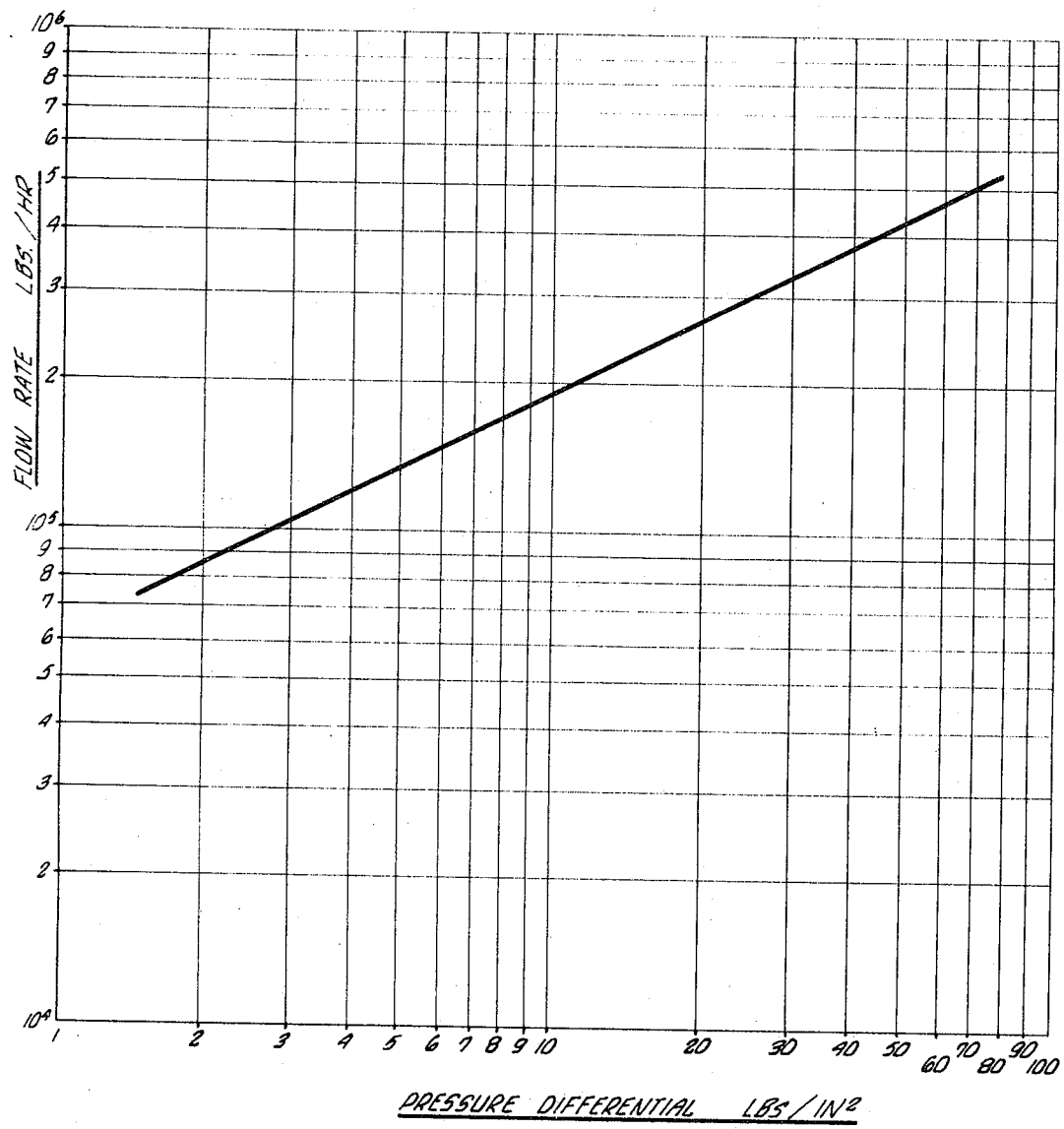
FIG. 4 is a plot on a log-log scale of flow rate versus pressure drop in a jet pump constructed in accordance with this invention.

FIG. 4 shows a typical plot of pressure difference between taps 46 and 50 versus total flow rate through the jet pump. Tubes 47 and 49 are sealed through a pressure vessel wall and the differential pressure gauge 48 is mounted externally of the pressure vessel so that flow rate through the pump is known accurately at any time by simply glancing at the differential pressure gauge.

Of course, the plot shown in FIG. 4 is not applicable to all jet pumps because the relationship between pressure differential and total flow rate will depend upon equipment size, choice of tap locations, quality of tap manufacture and maintenance, fluid conditions, equipment surface conditions (scale, rust, etc.), and diffuser geometry. Nevertheless, the results plotted in FIG. 4 are typical of calibration results, which for comparable conditions are usable to indicate the total flow rate by simply measuring pressure differential of fluid within the pump.

The pressure taps can be located at positions other than in the diffuser, and differential pressure can be measured at different locations. For example, a pressure tap 54 at the outlet end of the mixing chamber is connected by a tube 55 to one side of a differential pressure gauge 56, the other side of which is connected by a tube 57 to a pressure tap 58 located at about the midpoint of the diffuser. Alternatively, a pressure tap 60 at about the midpoint of the diffuser is connected by tube 61 to one side of a differential pressure gauge 62, the other side of which is connected by tube 63 to a pressure tap 64 mounted in the tail pipe anywhere downstream from the diffuser. In yet another form, a pressure tap 66 mounted in the mixing chamber wall near the outlet of the mixing chamber is connected by a tube 67 to one side of a differential pressure gauge 68, the other side of which is connected by a tube 69 to a pressure tap 70 mounted in the tail pipe wall anywhere downstream from the diffuser.

The differential pressure gauge can be of any conventional type, such as a bourdon tube differential pressure gauge, a conventional manometer, or any other mechanical or electromechanical differential pressure transducer.

Thus, with this invention, the flow rate through a jet pump is easily determined and even recorded, if desired, without interfering with the efficiency or operation of the pump. This provides accurate, reliable, and instant information concerning fluid-flow rate through the pump, which is essential to safe, economical, and efficient operation of a nuclear reactor core.

What is claimed is:

1. In a nuclear reactor system comprising a pressure vessel containing a nuclear core and a fluid coolant, a shroud surrounding said core and spaced from the inner wall of said pressure vessel to form a coolant flow space therebetween; at least one jet pump mounted in said flow space to pump coolant therethrough, said pump including in series a converging inlet opening, a substantially cylindrical mixing chamber, and a diverging diffuser, and a nozzle adjacent said inlet adapted to direct a jet of fluid into said inlet opening; the improvement comprising a first pressure tap mounted in said pump body downstream from said inlet opening, a second pressure tap located downstream of said first tap and downstream of said mixing chamber, and pressure responsive means connected to said first and second taps to provide a manifestation of the rate of fluid flow through the pump.

2. The system of claim 1 wherein both of said first and second pressure taps are located in said diffuser.

3. The system of claim 1 wherein said jet pump further includes a tail pipe attached to said diffuser and said second pressure tap is in said tail pipe.

References Cited

UNITED STATES PATENTS

| | | |
|---|---|---|
| 3,154,140 | 10/1964 | Esselman et al. |
| 1,641,295 | 9/1927 | Schroeder. |
| 2,240,119 | 4/1941 | Montgomery et al. |
| 2,861,033 | 11/1958 | Treshow. |
| 3,202,584 | 8/1965 | Bogaardt et al. |

REUBEN EPSTEIN, *Primary Examiner.*

U.S. Cl. X.R.

73—213; 103—258; 176—54, 58